Figure 1:
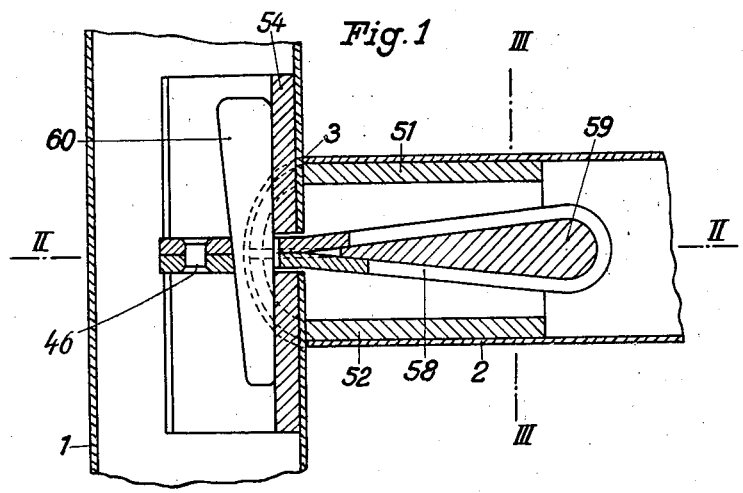

Sept. 11, 1934.   H. JUNKERS   1,972,997
STRUCTURAL ELEMENT
Filed Aug. 25, 1930

Inventor:
Hugo Junkers
by Karukukai
Atty.

Patented Sept. 11, 1934

1,972,997

UNITED STATES PATENT OFFICE 1,972,997

STRUCTURAL ELEMENT

Hugo Junkers, Dessau, Germany

Application August 25, 1930, Serial No. 477,593
In Germany September 5, 1929

2 Claims. (Cl. 287—54)

My invention relates to structural elements, and more particularly to structural elements having members arranged transversely to, and in contact with, each other.

It is an object of my invention to eliminate the difficulties involved by the usual methods of connecting the members of such elements, such as welding, soldering, riveting, and the like.

To this end in my element I provide a base plate adapted to engage one of the members to be connected and with this base plate I combine a connecting element which is anchored on the other member and equipped with means supported on the base plate and adapted to exert tensile stress on the connecting element.

My invention is particularly suitable for, but not limited to, thin-walled elements such as sections, pipes, flat parts and the like. It may be adapted to elements of any material.

For instance, if two pipes are to be connected, the base plate is inserted in one of the pipes and made with a cylindrical face fitting the inner wall of the pipe. The other pipe is also cut away at its end so as to form a cylindrical face fitting the outer wall of the pipe. The cylindrical face of the base plate is in line with the cylindrical face of the pipe. The connecting element is anchored in the other pipe, threaded through the wall of the first-mentioned pipe and through the base plate, and is equipped with means abutted on the base plate for exerting tension on the connecting element, for instance a nut or a wedge. In this manner the wall of the first-mentioned pipe, or any other member, is clamped between the base plate and the end of the other pipe or member and held against deformation by forces in the connecting element or in the connected members. When the pipe or other member is not accessible for the insertion of the base plate, and for operating the means by which tension is exerted on the connecting element, a bracing member is inserted in the pipe, the base plate is applied to one side of the pipe, and the pipe to be connected is applied to the opposite side of the first-mentioned pipe, all parts being in line with each other so that the thrust exerted by the tension of the connecting element is absorbed by the bracing member, and the wall of the first-mentioned pipe is again held against deformation.

The means for anchoring the tension element on the pipe to be attached is preferably connected with this pipe by friction. This eliminates the necessity of providing abutments, such as crozes, rivets or the like on the inner wall of the pipe to be attached. Any suitable means such as wedges may be provided for exerting pressure on the friction means, and preferably the wedge is operatively connected with the connecting element so that the friction member is applied to the wall of its pipe by the pull of the connecting element. This involves the advantage that the several parts need only be loosely assembled, while their positive connection is effected by exerting tension on the connecting element.

In the drawing affixed to this specification and forming part thereof, various structural elements embodying my invention are illustrated diagrammatically by way of example.

In the drawing

Figure 2:
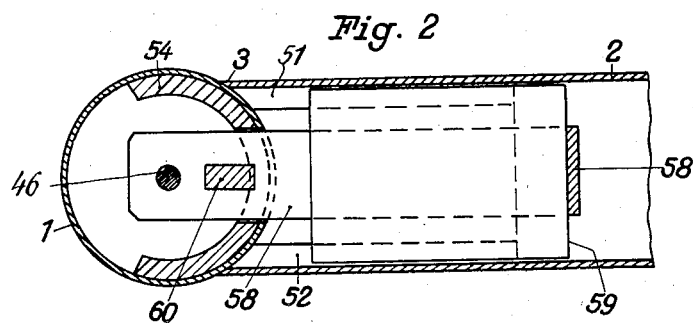
Figure 3:
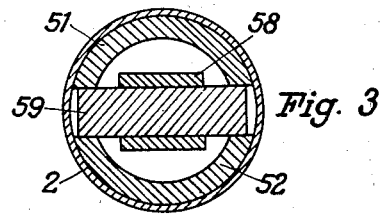
Figure 4:
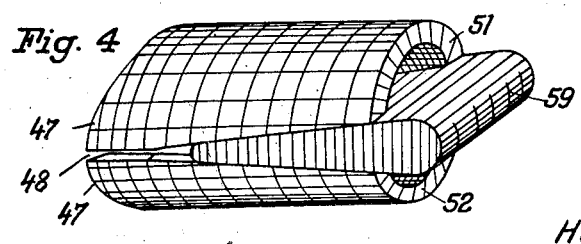

Fig. 1 is a section showing an element having two pipes extending at right angles to each other, with a frictional part for connecting the attached pipe to the principal pipe, Figs. 2 and 3 are sections on the lines II—II and III—III in Fig. 1, and Fig. 4 is a perspective illustration of the frictional part.

Referring to the drawing, two pipes 1 and 2 are connected by frictional means. 54 is the base plate which is here shown as a hollow cylinder. The connecting element has the form of a U-shaped strap 58 bent double about a wedge-shaped core 59, its ends being connected by a rivet 46 beyond the seat of a wedge 60 extending through a slot in the ends of the strap. 51, 52 are sleeves which act as friction members on the pipe 2 in which they are inserted, with their outer ends shaped in conformity with the end 3 of the pipe 2, as shown at 47 in Fig. 4. The gap 48 between the two sleeves is extended toward their inner ends for the reception of the core or wedge 59.

The strap 58 extends through a hole in the base plate 54. When the wedge 60 is set, the strap 58 moves the wedge 59 toward the principal pipe 1, forcing the sleeves 51 and 52 apart and holding them in tight frictional contact with the wall of the pipe 2. At the same time the sleeves act as bracing members for the pipe 2, particularly at their ends 47.

I wish it to be understood that I do not desire to be limited to the exact details of construction shown and described for obvious modifications will occur to a person skilled in the art.

I claim:—

1. A structural element comprising two tubular members arranged transversely to, and in direct contact with, each other, a base plate inserted in one of said tubular members and having an area in engagement with this tubular member which is at least equal to the area with which the other tubular member is in contact with the tubulalr member having the base plate, a sleeve subdivided longitudinally into two friction members inserted in the other tubular member so as to engage it on the inner wall, a wedge inserted between the two friction members so as to engage the edges along which said members are subdivided, and adapted to force the members apart, a tension member connected to said wedge and extending through the wall of the tubular member having the base plate, and through the base plate, and means supported by said base plate for exerting tension on said tension member.

2. A structural element comprising two tubular members arranged transversely to, and in direct contact with, each other, a base plate inserted in one of said tubular members and having an area in engagement with this tubulalr member which is at least equal to the area with which the other tubular member is in contact with the tubulalr member having the base plate, a sleeve which presents a pair of shots extending in the direction of its axis and is inserted in the other tubulalr member so as to engage it on the inner wall, a wedge adapted to engage in said slots and to spread the sleeve, a tension member connected to said wedge and extending through the wall of the tubular member having the base plate, and through the base plate, and means supported by said base plate for exerting tension on said tension member.

HUGO JUNKERS.